United States Patent
Narayanan et al.

(10) Patent No.: US 11,218,336 B2
(45) Date of Patent: Jan. 4, 2022

(54) HARDWARE BASED PACKET REPLICATION AT TAIL END NODE

(71) Applicant: Cisco Technology, Inc., San Jose, CA (US)

(72) Inventors: Swami Narayanan, San Jose, CA (US); Ambrish Mehta, Milpitas, CA (US); Venkatesh Srinivasan, San Jose, CA (US); Raghava Sivaramu, Fremont, CA (US); Ayan Banerjee, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/842,422

(22) Filed: Apr. 7, 2020

(65) Prior Publication Data

US 2020/0235959 A1    Jul. 23, 2020

Related U.S. Application Data

(63) Continuation of application No. 15/714,761, filed on Sep. 25, 2017, now Pat. No. 10,623,207.

(51) Int. Cl.
*H04L 12/46* (2006.01)
*H04L 12/04* (2006.01)
*H04L 29/06* (2006.01)

(52) U.S. Cl.
CPC .......... *H04L 12/4633* (2013.01); *H04L 12/04* (2013.01); *H04L 63/029* (2013.01); *H04L 69/02* (2013.01)

(58) Field of Classification Search
None
See application file for complete search history.

(56) References Cited

U.S. PATENT DOCUMENTS

| | | | |
|---|---|---|---|
| 9,432,204 B2 | 8/2016 | Shen et al. | |
| 9,577,927 B2* | 2/2017 | Hira | H04L 12/18 |
| 9,596,099 B2 | 3/2017 | Yang et al. | |
| 10,103,902 B1 | 10/2018 | Sampath et al. | |
| 2005/0141502 A1* | 6/2005 | Kumar | H04L 45/60 |
| | | | 370/390 |
| 2011/0080855 A1* | 4/2011 | Fung | H04L 45/58 |
| | | | 370/256 |
| 2015/0280928 A1 | 10/2015 | Tessmer et al. | |

(Continued)

*Primary Examiner* — Ayanah S George
(74) *Attorney, Agent, or Firm* — Polsinelli PC

(57) ABSTRACT

Aspects of the disclosed technology address limitations relating to packet replication for multi-destination traffic, by providing methods for performing hardware-based replication in network infrastructure devices, such as switches. In some aspects, application specific integrated circuits (ASICs) resident in physical devices can be used to perform packet replication. Depending on implementation, a hardware-based replication process can include steps for receiving a first packet that includes a first outer header containing first address information, receiving a second packet including a second outer header containing a hardware replication flag, forwarding the first packet to all virtual tunnel endpoints (VTEPs) connected with the TOR switch, and performing hardware replication for the second packet based on the hardware replication flag to generate one or more unicast packets. Systems and machine readable media are also provided.

20 Claims, 6 Drawing Sheets

(56) References Cited

U.S. PATENT DOCUMENTS

2015/0381494 A1* 12/2015 Cherian ............... H04L 45/745
                                                    370/392
2017/0093636 A1    3/2017  Chanda et al.
2018/0097734 A1    4/2018  Boutros et al.

* cited by examiner

HARDWARE BASED PACKET REPLICATION AT TAIL END NODE

CROSS-REFERENCE TO RELATED APPLICATION

The instant application is a Continuation of, and claims priority to, U.S. patent application Ser. No. 15/714,761 entitled HARDWARE BASED PACKET REPLICATION AT TAIL END NODE filed Sep. 25, 2017, the contents of which are herein incorporated by reference in its entirety.

BACKGROUND

1. Technical Field

The subject technology relates to the optimization of packet replication and in particular, systems and methods for performing hardware-based packet replication to reduce replication loads on virtual switches and decrease network loads.

2. Introduction

Network Function Virtualization (NFV) technology, in combination with Software Defined Networking (SDN), promises to help transform today's carrier networks. It will transform how they are deployed and managed, and the way services are delivered. Some ultimate goals are to enable service providers to reduce costs, increase business agility, and accelerate the time to market of new services.

The utilization of NFV and SDN technologies allows the decoupling of network functions from underlying hardware so they run as software images or logical modules on commercial off-the-shelf and purpose-built hardware. NFV does so by using virtualization technologies (computers, networks, and storage media) to virtualize network functions. The objective is to reduce the dependence on physical devices by allocating and using physical and virtual resources only when and where needed. With such approaches, service providers can reduce overall costs by shifting components to a common physical infrastructure while optimizing its use, allowing them to respond more dynamically to changing market demands by deploying new applications and services as needed. The virtualization of network functions accelerates the time to market for new services by allowing for more automated and streamlined approaches to service delivery.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION

Figure 1:
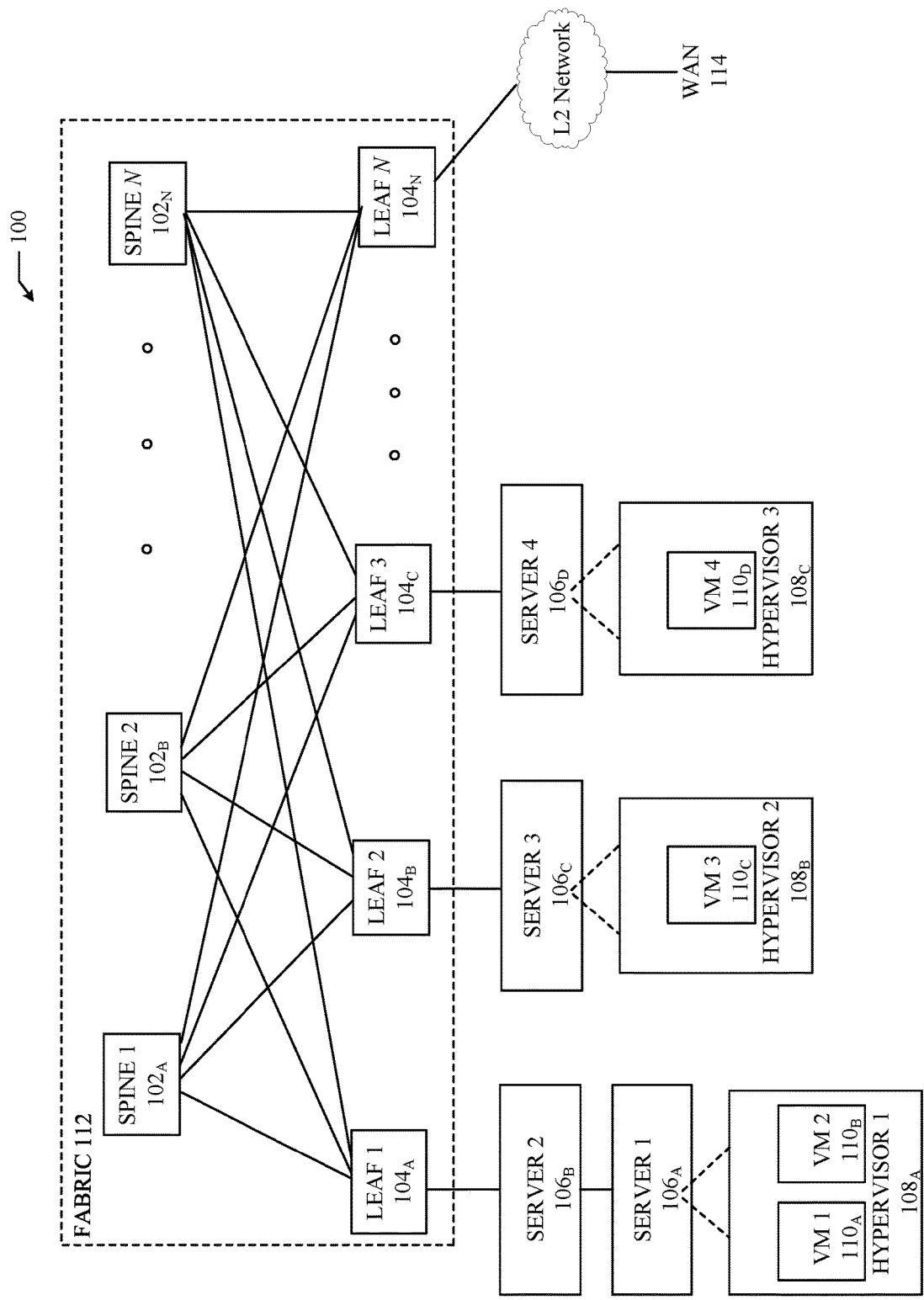
FIG. 1 illustrates an example network environment in which some aspects of the technology can be implemented.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology; however, it will be clear and apparent that the subject technology is not limited to the specific details set forth herein and may be practiced without these details. In some instances, structures and components are shown in block diagram form in order to avoid obscuring the concepts of the subject technology.

Overview:

With the proliferation of network function virtualization (NFV) technologies, many network functionalities that were previously performed by hardware devices are now routinely implemented by virtual components, for example, as virtual machines (VMs) or networking containers. To enable virtual device communication across various portions of network fabric, overlay options are implemented for encapsulating and transporting packets. In some approaches, containers utilize various overlay network options, for example, using plugins on virtual tunnel endpoint (VTEP) switches that serve a respective host node. Software VTEP implementations conventionally use ingress replication (e.g., head-end replication) for multi-destination traffic (i.e., BUM traffic) to eliminate the need for L3 multicast to be enabled in the underlay network, which can span multiple sites and different administrative domains.

Performing ingress packet replication works well on software VTEPs for small scale networks, such as, where VMs are implemented. However, the use of containers has exponentially increased the number of communicating devices running on a single host node, resulting in significant performance issues for multi-destination traffic replication. In some conventional solutions, replication is performed using a proxy server deployed within a local area network (LAN) segment; however, such solutions are not effective at eliminating the replication load on the server and wasted bandwidth on the physical links. In some conventional approaches, multicast based replication can be used to avoid some of the foregoing issues, but is not an optimal solution because of the requirement for multicast underlay support at every tunnel end point (TEP), making such deployments difficult to implement across multi-domain networks.

Description:

Aspects of the disclosed technology address the foregoing packet replication problems by making use of existing hardware infrastructure to perform packet replication. As such, implementations of the disclosed technology eliminate the need to add additional replication resources (e.g., replicate servers) in every LAN segment.

In accordance with some aspects of the technology, packet replication for multi-destination traffic, e.g., broadcast, unknown unicast and multicast (BUM) traffic, can be performed using hardware resources, such as application specific integrated circuits (ASICs) provided by various switching devices, such as TOR switches. As discussed in further detail below, packet header information can be used to indicate when packet replication should be performed using switching hardware resources. Packets can be replicated as unicast traffic, wherein unicast packets are forwarded to each last hop TOR switch having a destination in the underlay network. Upon receipt of the respective inbound unicast packets, the receiving TOR switches (e.g., the remote VTEP penultimate hop) can perform a unicast to multicast translation (e.g., based on the VNIs), and the translated packet is delivered to all VNI member ports using a Layer 2 multicast, for example, with a multicast destination address in the outer packet header.

FIG. 1 illustrates a diagram of an example network environment 100 in which some aspects of the technology may be implemented. Fabric 112 can represent the underlay (i.e., the physical network) of environment 100. Fabric 112 includes spine switches 1-N ($102_{A-N}$) (collectively "102") and leaf switches 1-N ($104_{A-N}$) (collectively "104"). Leaf switches 104 can reside at the edge of fabric 112, and can represent the physical network edges. Leaf switches 104 can be, for example, top-of-rack ("TOR") switches, aggregation switches, gateways, ingress and/or egress switches, provider edge devices, and/or any other type of routing or switching device.

Leaf switches 104 can be responsible for routing and/or bridging tenant or endpoint packets and applying network policies. Spine 102 can perform switching and routing within fabric 112. Thus, network connectivity in fabric 112 can flow from spine switches 102 to leaf switches 104, and vice versa. Leaf switches 104 can include servers 1-4 ($106_{A-D}$) (collectively "106"), hypervisors 1-3 (108A-108c) (collectively "108"), virtual machines (VMs) 1-4 ($110_A$-$110_D$) (collectively "110"). For example, leaf switches 104 can encapsulate and decapsulate packets to and from servers 106 in order to enable communications throughout environment 100. Leaf switches 104 can also connect other network-capable device(s) or network(s), such as a firewall, a database, a server, etc., to the fabric 112. Leaf switches 104 can also provide any other servers, resources, endpoints, external networks, VMs, services, tenants, or workloads with access to fabric 112.

In some aspects, when leaf switches 104 function as TOR switches, they can be configured to route traffic from virtual devices residing on one or more servers to other portions of network fabric 112. By way of example, one or more containers and/or VMs instantiated on the servers (e.g., Server 1 106A), can send packets to other portions of network fabric 112 via their respective TOR switch (e.g., leaf 1 104A). Hardware-based packet replication performed for multi-destination traffic (e.g., BUM traffic) can be performed on the head-end switch, as well as on the last hop TOR (tail-end) switch, to minimize load on software switches and reduce traffic load on various network segments in the network underlay.

Figure 2A:
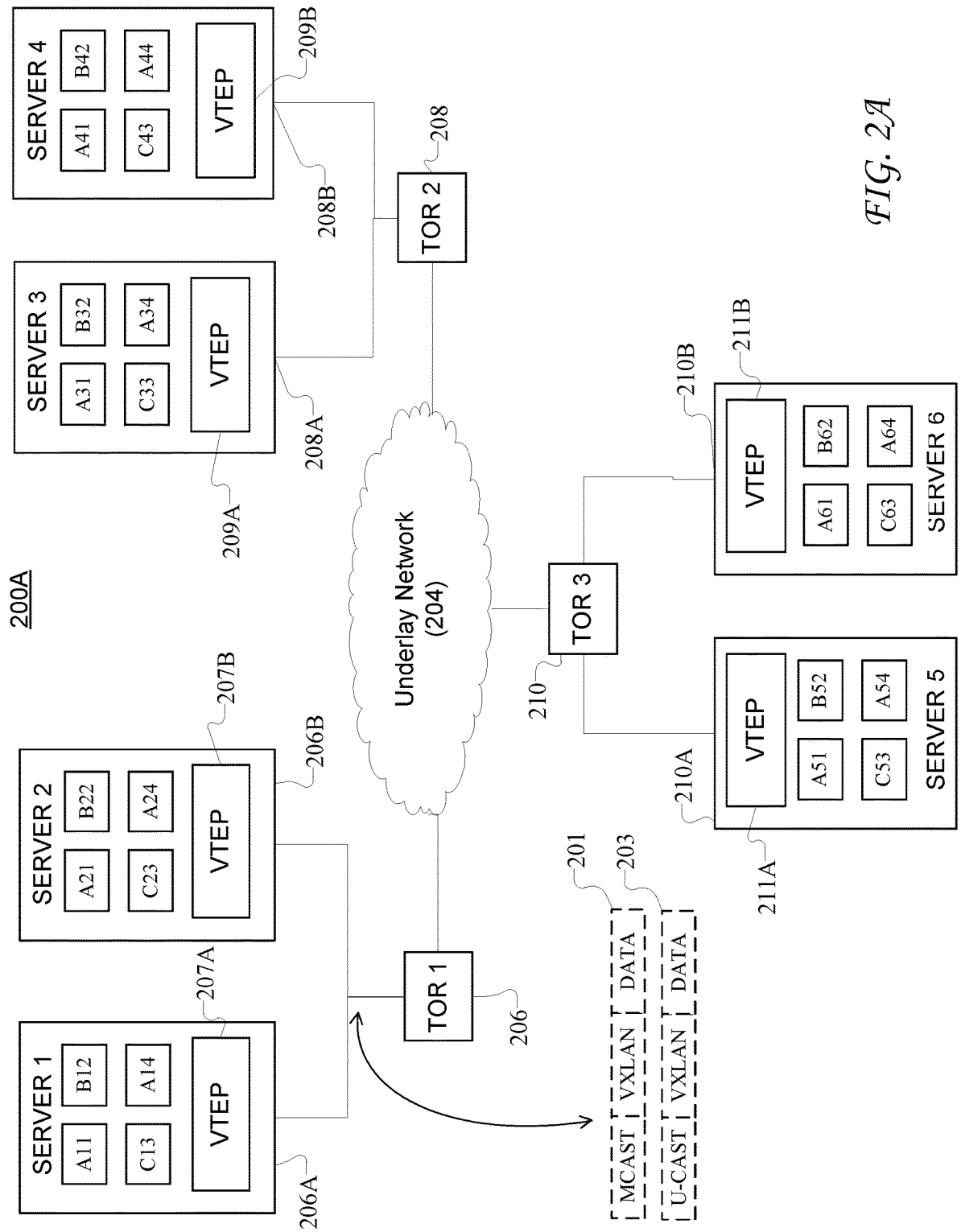
FIGS. 2A-2C illustrate an example of an underlay network in which a hardware-based replication method of the technology can be implemented.

FIG. 2A illustrates an example of an underlay network environment 200A in which hardware-based pack replication can be implemented on various TOR switches. As illustrated, underlay network 204 provides communicative coupling between various top-of-rack (TOR) switches, e.g., TOR 1 206, TOR 2 208, and TOR 3 210. Each TOR switch includes servers including a respective virtual switches e.g., a virtual tunnel end-point (VTEP) that provide switching functionality to virtual devices, such as containers and VMs.

In the example configuration, TOR 1 206 includes Server 1 206A, and Server 2 206B; TOR 2 206 includes Server 3 208A, and Server 4 208B; and TOR 3 includes Server 5 210A, and Server 6 210B. Each server includes a multitude of virtual devices for which switching is accomplished using a corresponding VTEP. For example, Server 1 206A includes VTEP 207A, as well as multiple networking containers, i.e., A11, B12, C13, and A14. Server 2 206B includes VTEP 207B, and containers A21, B22, C23, and A24. Server 3 208A includes VTEP 209A, and containers A31, B32, C33, and A34. Server 4 208B includes VTEP 209B and containers A41, B42, C43, and A44. Server 5 210A includes VTEP 211A, and containers A31, B32, C33, and A34; and Server 6 210B includes VTEP 211B, and containers A41, B42, C43, and A44.

It is understood that the example configuration of FIG. 2A is provided as an example configuration and that other network configurations can be implemented without departing from the technology. For example, environment 200A could include a greater (or fewer) number of TOR switches, each of which could include a greater (or fewer) number of servers, virtual switches (VTEPs), and/or containers or VMs (not illustrated).

Each container is assigned to a virtual network interface (VNI). By way of example, containers A11, A14, A21, A24, A31, A34, A41, A44, A51, A54, A61, and A64 belong to a common VNI (e.g., VNI 100); containers B11, B14, B21, B24, B31, B34, B41, B44, B51, B54, B61, and B64 belong to a common VNI (e.g., VNI 200); and containers C11, C14, C21, C24, C31, C34, C41, C44, C51, C54, C61, and C64 belong to a common VNI (e.g., VNI 300). Mappings between each respective VNI and VTEPS 207, 209, and 211 are maintained by a network management appliance, such as a network controller (not illustrated). VNI to VTEP mappings can either be automatically discoverable by a controller or ascertained upon VTEP registration, depending on the desired implementation. Additionally, the controller can maintain a database of mappings between VTEP/VNI and the respective TOR switches to provide a mapping between each VNI and a locally significant multicast address. Such mappings can be pushed to every VTEP and all associated TORs.

In practice, any multi-destination packet originated by a networking container can be received at its corresponding VTEP (virtual switch). The receiving VTEP adds virtual extensible LAN (VXLAN) encapsulation (e.g., for transport across one or more network overlays in the network fabric), and generates two copies of the packet: one Unicast and one Multicast version. The multicast packet is created with a multicast group address for the corresponding VNI in the outer header, and is used to deliver the packet to all VTEPs associated with the same TOR, in the same domain. The unicast packet is created with an Anycast IP in the outer header, as well as a hardware replication flag, i.e., a "replicate_locally" bit set.

When the unicast packet is received by the first-hop TOR from the VTEP, the first-hop TOR matches the Anycast IP address in the header, for example, to ascertain an ingress replication list indicating all last-hop TORs corresponding VTEPs on the same VNI. The receiving first-hop TOR then uses hardware replication (e.g., using one or more ASICs), based on the hardware replication flag, to generate and send a packet copy to each last-hop TOR in the underlay network. Each receiving last-hop TOR (remote VTEP penultimate hop) is programmed to use hardware replication to perform a Unicast to Multicast group translation, generating a Multicast packet that is sent out to all VNI member ports using Layer 2 multicast, for example, where the multicast address is provided as the destination in the outer packet header.

By way of example with respect to example environment 200A illustrated with respect to FIG. 2A, container A11 in Server 1 206A can generate a multi-destination Layer 2 packet (e.g., to all recipient containers associated with VNI 100), which is duplicated and encapsulated by VTEP 207A. In this example, VTEP 207A generates a first packet 201 having a multicast address in its outer header, and a second packet 203 having a unicast address in its outer header. Both packets are forwarded to TOR 1 206. Once received by TOR 1 206, first packet 201 is provided to all VTEPs attached to TOR 1 206, based on the specified multi-group address for the corresponding VNI, i.e., first packet 201 is forwarded to VTEP 207B in Server 2 206B, and delivered to all VNI recipients, e.g., containers A21 and A24. Second packet 203 is replicated by TOR 1 206, using available hardware resources, such as ASICs resident on the switch.

As discussed above, hardware replication on TOR 1 206 can be performed based on the presence of a hardware replication flag, i.e., a "replicate_locally" bit set by VTEP 207A in the outer packet header of second packet 203.

Figure 2B:
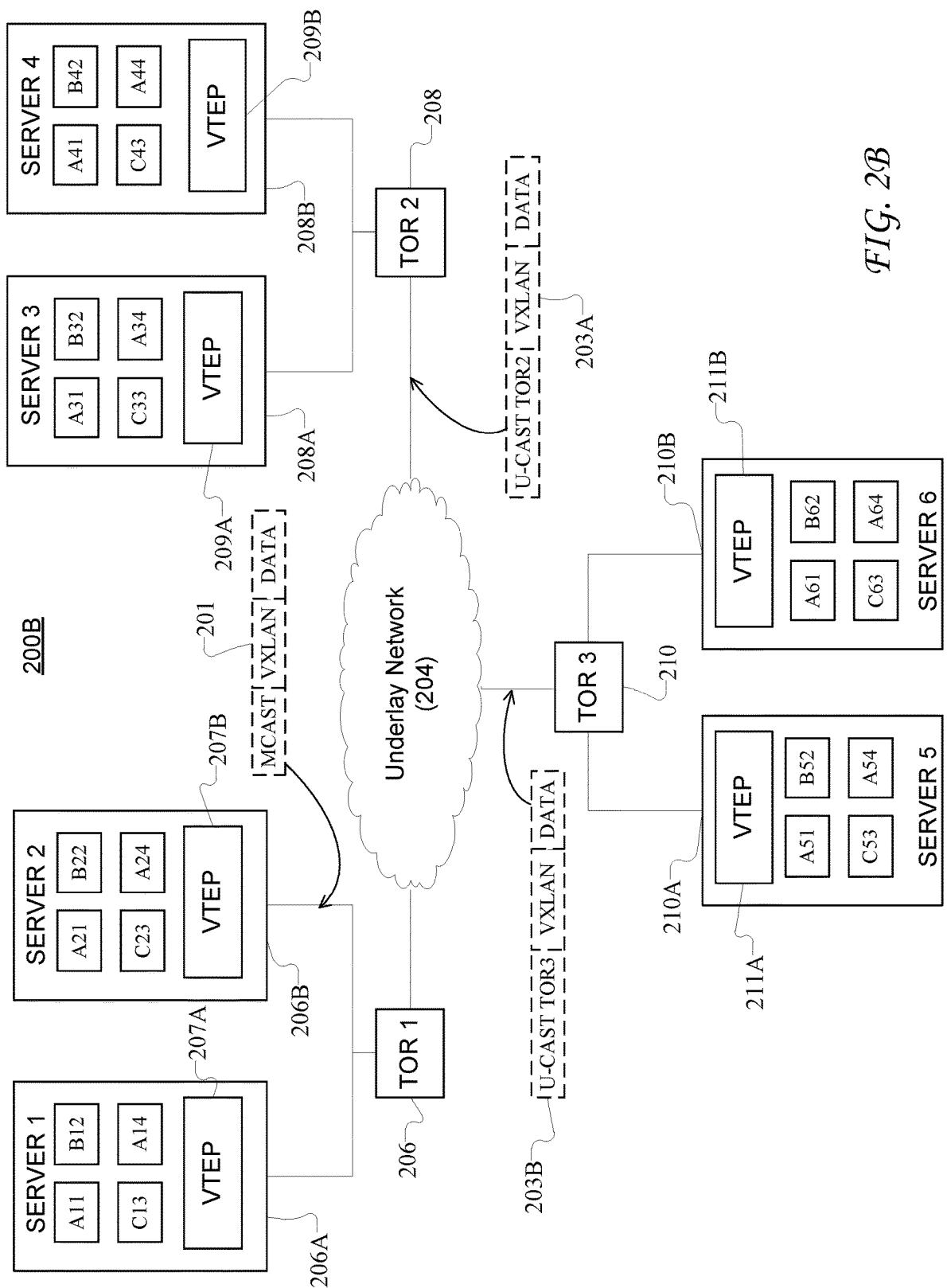

FIG. 2B illustrates a result of hardware replication performed by TOR 1 206. In particular, the hardware replication performed by TOR 1 206 results in the generation and forwarding of unicast packets to each last-hop TOR having a destination address in the underlay network. That is, TOR 1 206 generates Unicast packet 203A that is forwarded to TOR 2 208, and Unicast packet 203B that is sent to TOR 3 210. Once received by the respective TOR switches (e.g., remote VTEP penultimate hop), the receiving TORs perform a Unicast-to-Multicast group translation based on the associated VNIs. The last-hop TOR switches also utilize hardware based packet replication when performing the Unicast-to-Multicast translation. As discussed above, hardware-based packet replication can be performed as a result of hardware replication flags indicated in header data of each unicast packet received from TOR 1 206 (e.g., first packet 203A and second packet 203B).

Figure 2C:
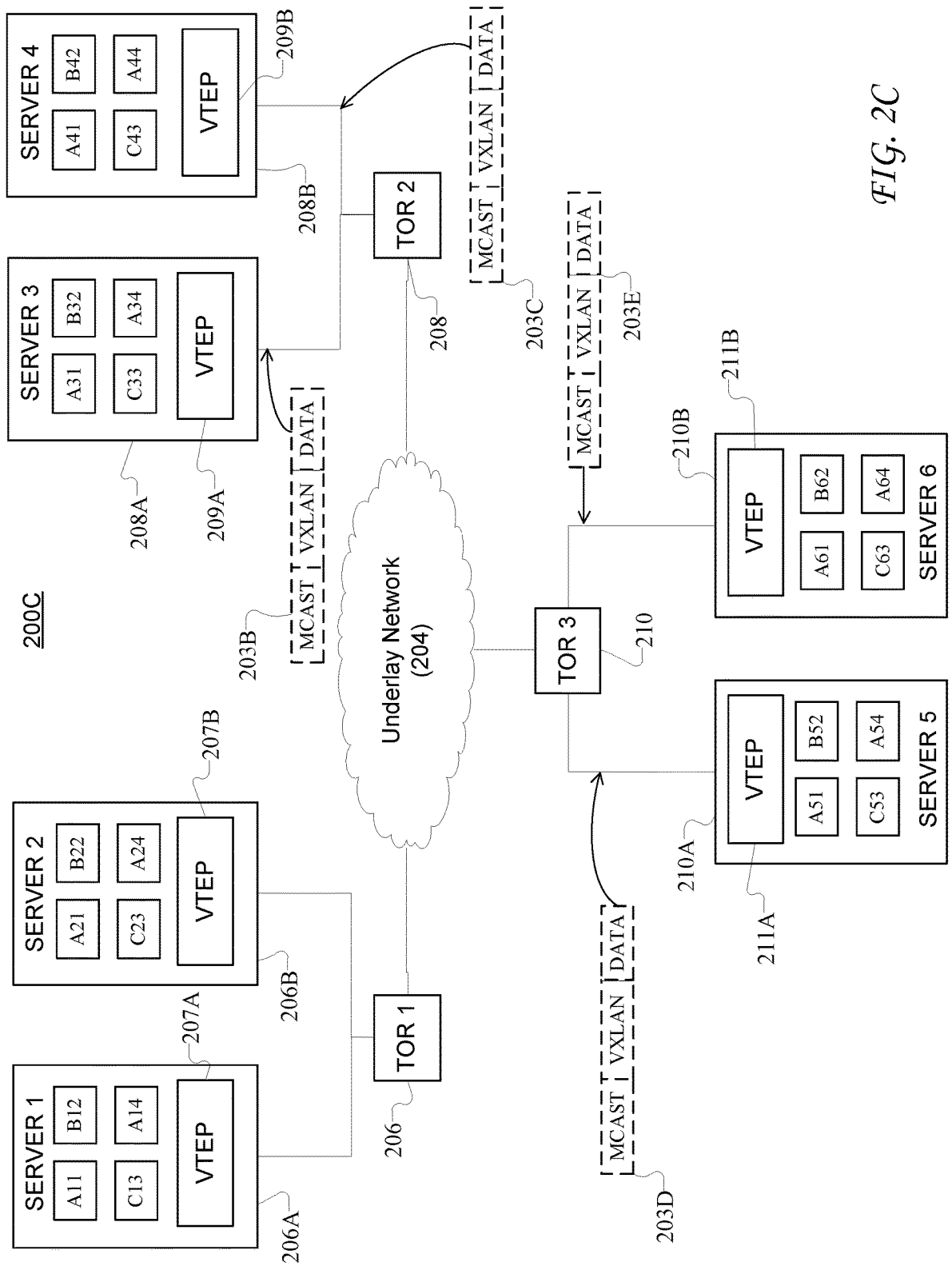

FIG. 2C illustrates an example environment 200C resulting from the Unicast-to-Multicast translation performed by last-hop TORs 208, and 210. As illustrated, multicast packets 203B and 203C resulting from hardware replication performed by TOR 2 208, are forwarded to each respective VTEP, e.g., VTEPs 209A and 209B. Similarly, multicast packets 203D and 203E resulting from hardware replication performed by TOR 2 208, are forwarded to each respective VTEP, e.g., VTEPs 211A and 211B. The packets are then distributed by the local VTEP to their container recipients, for example, based on VNI/VTEP mappings. In this example, multicast packet 203B is delivered by VTEP 209A to containers A31 and A34. Multicast packet 203C is delivered by VTEP 209B to each of containers A41 and A44. Multicast packet 203D is delivered by VTEP 211A to containers A51 and A54; and multicast packet 203E is delivered by VTEP 211B to containers A61 and A64.

Figure 3:
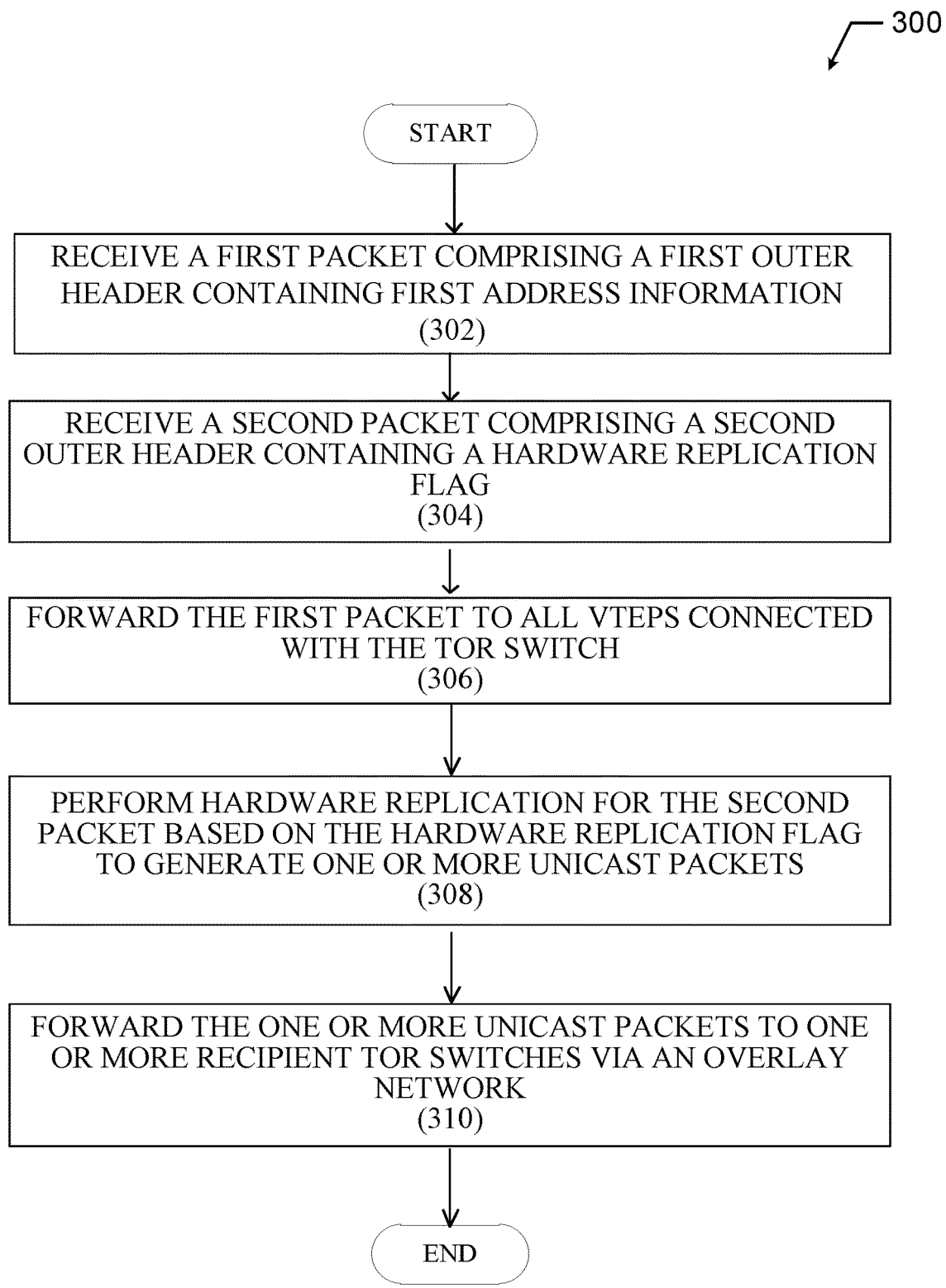
FIG. 3 illustrates steps of an example process for performing hardware-based packet replication using top-of-rack (TOR) switches, according to some aspects.

FIG. 3 illustrates steps of an example process 300 for performing hardware-based packet replication using top-of-rack (TOR) switches, according to some aspects of the technology. Process 300 begins with step 302 in which a first packet is received, for example, by a first-hop TOR switch such as TOR 1 206, discussed above. The first packet can be a multicast packet that is received from a corresponding VTEP (e.g., VTEP 207A), and which comprises VXLAN encapsulation, as well as a data payload that is provided by an originating container or other virtual network device.

In step 302, a second packet is received by the TOR switch. Similar to the first packet, the second packet can be received from the same VTEP, but can be a multicast packet that includes a multicast address, a VXLAN encapsulation, and a data payload provided by the originating container. In some aspects, the data payload of the first packet and second packets received by the TOR (e.g., first-hop TOR) is the same, i.e., a common payload provided as part of a multi-destination data transmission, i.e., BUM traffic. The second packet can also include a hardware replication flag, i.e., data contained in the header that indicates that hardware packet replication is to be performed by the receiving switch. As discussed above, the hardware replication flag can be set by the encapsulating VTEP, and can include a "replicate_locally" bit provided in the outer header.

In step 306, the TOR forwards the first packet to all virtual tunnel endpoints (VTEPs) associated with the TOR switch. In some aspects, recipient VTEPs are those that share a common domain with the originating container. Further to the example discussed above with respect to FIGS. 2A-2C, the first (multicast) packet can be forwarded to all recipient VTEPs for distribution to recipient containers sharing a common VNI.

In step 308, the TOR performs hardware replication for the second packet based on the hardware replication flag. Hardware replication performed by the first-hop TOR (e.g., TOR 1 206, discussed above), can include generating replicated unicast packets using hardware resources, such as one or more ASICs, resident on the first-hop TOR switch.

In step 310, the generated unicast packets are forwarded to the respective last-hop TOR switches via an underlay network (Layer 2). As such, only one packet copy is propagated over the underlay network for each destination last-hop TOR. The receiving last-hop TORs can perform hardware-based replication, for example, to accomplish a Unicast-to-Multicast translation for the received unicast packet. As discussed above, the generated multicast packets are forwarded to an associated VTEP, and distributed to the intended recipients (containers) based on VNI affiliation.

By using hardware replication in head-end nodes (e.g., TORs), aspects of the technology can drastically reduce total packet count on different segments of the underlay network, without impacting performance and latency of packets sent to different endpoints.

Figure 4:
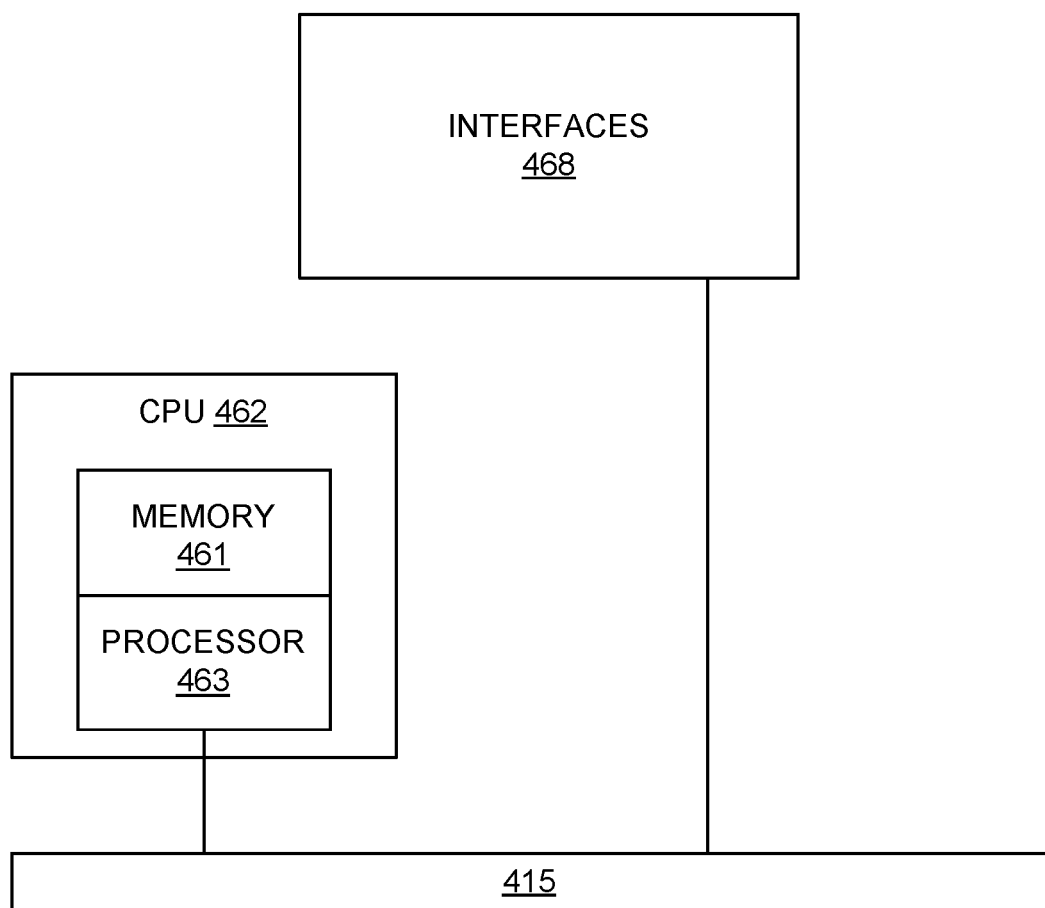
FIG. 4 illustrates an example network device on which some aspects of the technology can be implemented.

FIG. 4 illustrates an example network device 410 that can be used to implement one or more networking devices, such as TORs and/or servers, as discussed above. Network device 410 includes master central processing unit (CPU) 462, interfaces 468, and a bus 415 e.g., a Peripheral Computer Interconnect (PCI) bus. CPU 462 can be configured to perform monitoring for one or more virtual network functions under the control of software including an operating system and any appropriate applications software. CPU 462 can include one or more processors 463, such as processors from the Intel, ARM, and/or Motorola family of microprocessors or the MIPS family of microprocessors. In an alternative embodiment, processor 463 is specially designed hardware for controlling the operations of network device 410. In a specific embodiment, a memory 461 (such as non-volatile RAM and/or ROM) also forms part of CPU 462. However, there are many different ways in which memory could be coupled to the system.

Interfaces 468 can be provided as interface cards (sometimes referred to as "network interface cards" (NICs) or "line cards"). Generally, they control the sending and receiving of data packets over the network and sometimes support other peripherals used with device 410. Among the interfaces that may be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High Speed Serial Interfaces (HSSIs), Point of Sale (POS) interfaces, Fiber Distributed Data Interface (FDDIs), and the like. Generally, these interfaces can include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more non-transitory memories or memory modules (including memory 461) configured to store program instructions for general-purpose network operations and mechanisms necessary to implement hardware replication for multi-destination traffic in one or more network devices.

For example, memory 461 can include a non-transitory computer-readable medium that includes instructions for causing CPU 462 to execute operations for receiving a first packet at a TOR switch, the first packet comprising a first outer header containing first address information, receiving a second packet at the TOR switch, the second packet comprising a second outer header containing a hardware replication flag, forwarding the first packet to all virtual tunnel endpoints (VTEPs) connected with the TOR switch, and performing hardware replication for the second packet based on the hardware replication flag to generate one or more unicast packets. In some aspects, CPU 462 can further be configured to execute operations for forwarding the one or more unicast packets to one or more recipient TOR switches via a underlay network.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for improving traffic flow performance at a switch in a virtual network environment, the method comprising:
   receiving a multicast packet at the switch;
   receiving a unicast packet at the switch, the unicast packet containing a hardware replication flag;
   determining whether to replicate the multicast packet at the switch based on both the multicast packet being destined to a multicast address and the multicast packet failing to include a multicast packet hardware replication flag;
   forwarding, by the switch, the multicast packet to virtual tunnel endpoints connected with the switch while refraining from replicating the multicast packet at the switch based on both the multicast packet being destined to the multicast address and the multicast packet failing to include the multicast packet hardware replication flag;
   performing hardware replication at the switch for the unicast packet based on the hardware replication flag to generate one or more unicast packets; and
   forwarding, from the switch, the one or more unicast packets to one or more recipient switches in a network.

2. The method of claim 1, wherein the switch is a top of rack switch.

3. The method of claim 1, wherein performing hardware replication further comprises:
   generating one unicast packet for each recipient switch in the network.

4. The method of claim 1, wherein hardware replication is performed using one or more Application Specific Integrated Circuits.

5. The method of claim 1, wherein the unicast packet includes packet replication information configured to cause a respective receiving switch to perform a unicast to multicast group translation.

6. The method of claim 5, wherein the unicast to multicast group translation produces a translated packet, and the method further comprises:
   delivering the translated packet using a Layer 2 multicast address.

7. The method of claim 1, wherein the unicast packet includes unicast address information, and the multicast packet includes multicast address information.

8. A switch comprising:
a non-transitory computer-readable medium storing instructions;
a processor programmed to cooperate with the instructions to cause the switch to perform operations comprising:
receiving a multicast packet at the switch;
receiving a unicast packet at the switch, the unicast packet containing a hardware replication flag;
determining whether to replicate the multicast packet at the switch based on both the multicast packet being destined to a multicast address and the multicast packet failing to include a multicast packet hardware replication flag;
forwarding, by the switch, the multicast packet to virtual tunnel endpoints connected with the switch while refraining from replicating the multicast packet at the switch based on both the multicast packet being destined to the multicast address and the multicast packet failing to include the multicast packet hardware replication flag;
performing hardware replication at the switch for the unicast packet based on the hardware replication flag to generate one or more unicast packets; and
forwarding, from the switch, the one or more unicast packets to one or more recipient switches in a network.

9. The switch of claim 8, wherein the switch is a top of rack switch.

10. The switch of claim 8, wherein performing hardware replication further comprises:
generating one unicast packet for each recipient switch in the network.

11. The switch of claim 8, wherein hardware replication is performed using one or more Application Specific Integrated Circuits.

12. The switch of claim 8, wherein the unicast packet includes packet replication information configured to cause a respective receiving switch to perform a unicast to multicast group translation.

13. The switch of claim 12, wherein the unicast to multicast group translation produces a translated packet, and the operations further comprise:
delivering the translated packet using a Layer 2 multicast address.

14. The switch of claim 8, wherein the unicast packet includes unicast address information, and the multicast packet includes multicast address information.

15. A non-transitory computer-readable storage media comprising instructions stored therein, which when executed by a processor cause the processors to perform operations comprising:
receiving a multicast packet at a switch;
receiving a unicast packet at the switch, the unicast packet containing a hardware replication flag;
determining whether to replicate the multicast packet at the switch based on both the multicast packet being destined to a multicast address and the multicast packet failing to include a multicast packet hardware replication flag;
forwarding, by the switch, the multicast packet to virtual tunnel endpoints connected with the switch while refraining from replicating the multicast packet at the switch based on both the multicast packet being destined to the multicast address and the multicast packet failing to include the multicast packet hardware replication flag;
performing hardware replication at the switch for the unicast packet based on the hardware replication flag to generate one or more unicast packets; and
forwarding, from the switch, the one or more unicast packets to one or more recipient switches in an network.

16. The non-transitory computer-readable storage media of claim 15, wherein the switch is a top of rack switch.

17. The non-transitory computer-readable storage media of claim 15, wherein performing hardware replication further comprises:
generating one unicast packet for each recipient switch in the underlay network.

18. The non-transitory computer-readable storage media of claim 15, wherein hardware replication is performed using one or more Application Specific Integrated Circuits.

19. The non-transitory computer-readable storage media of claim 15, wherein the unicast packet includes packet replication information configured to cause a respective receiving switch to perform a unicast to multicast group translation.

20. The non-transitory computer-readable storage media of claim 19, wherein the unicast to multicast group translation produces a translated packet, and the operations further comprise:
delivering the translated packet using a Layer 2 multicast address.

* * * * *